Figure 11:
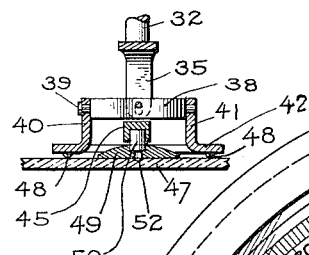

Jan. 12, 1926.  
E. R. HAND  
1,569,745  
RADIOCOMPASS READING DEVICE FOR SHIPS  
Filed August 30, 1923     3 Sheets-Sheet 1
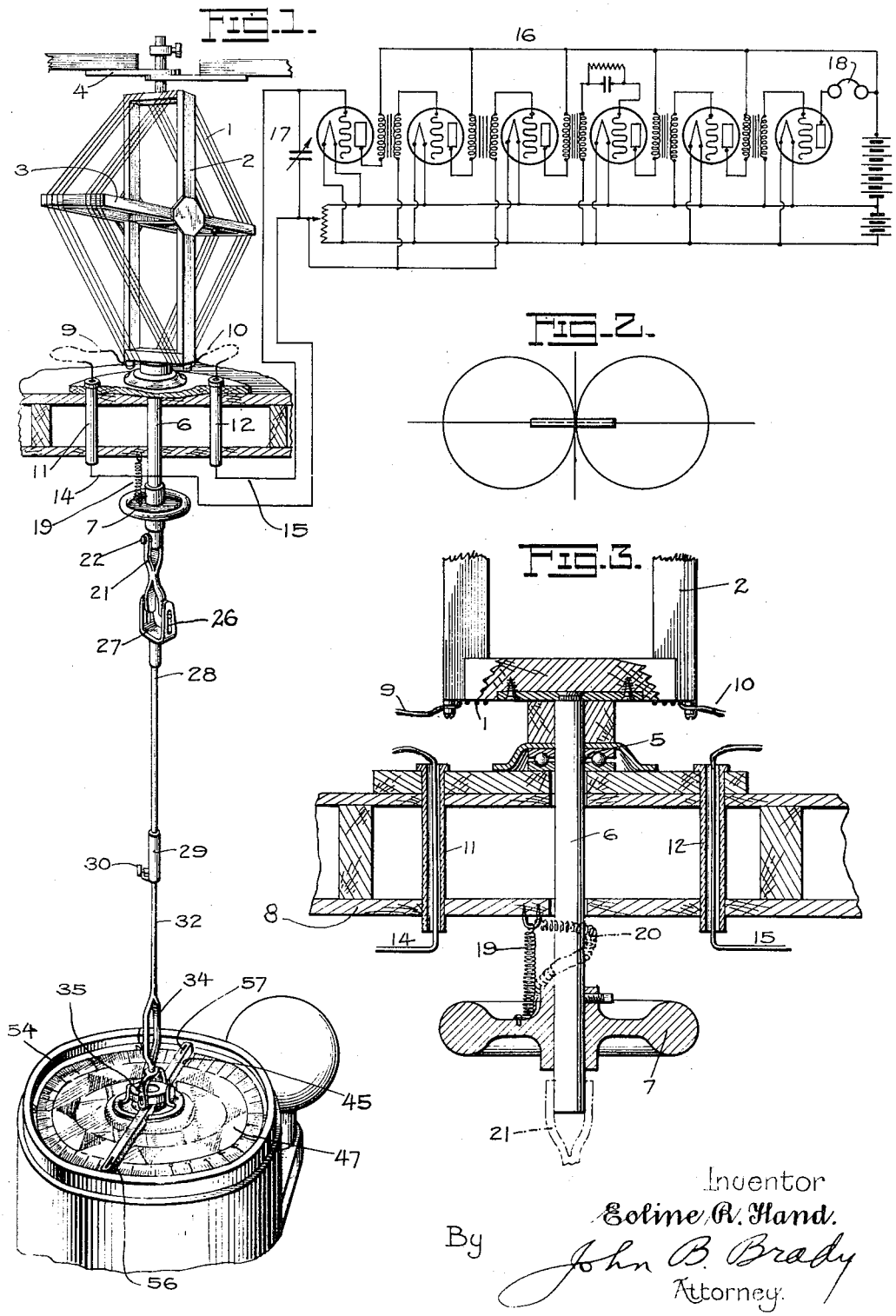
Inventor  
Eoline R. Hand.  
By John B. Brady  
Attorney.

Jan. 12, 1926.  1,569,745
E. R. HAND
RADIOCOMPASS READING DEVICE FOR SHIPS
Filed August 30, 1923   3 Sheets-Sheet 2
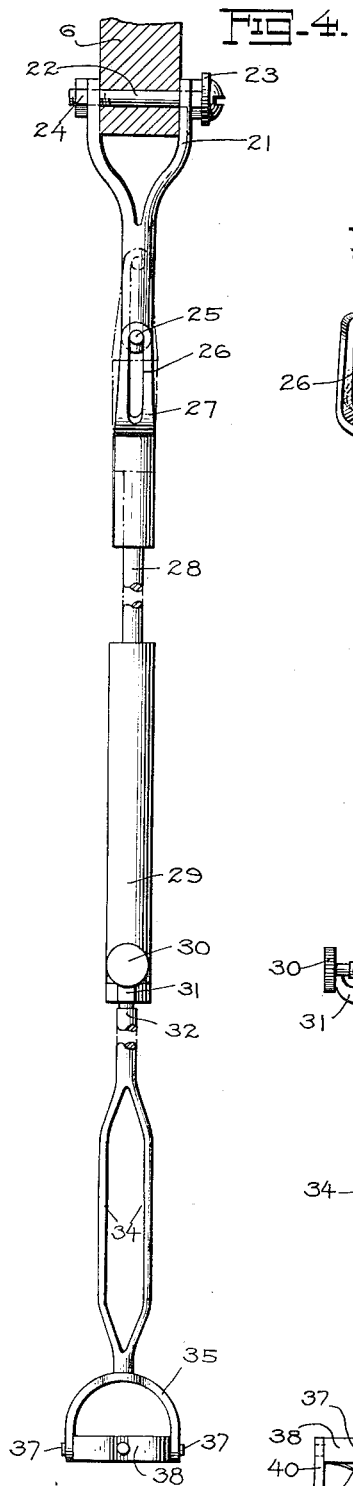
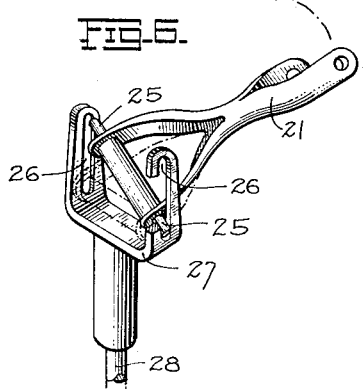
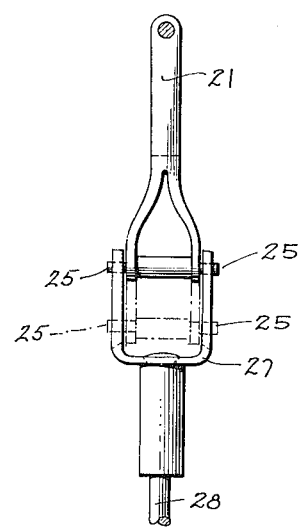
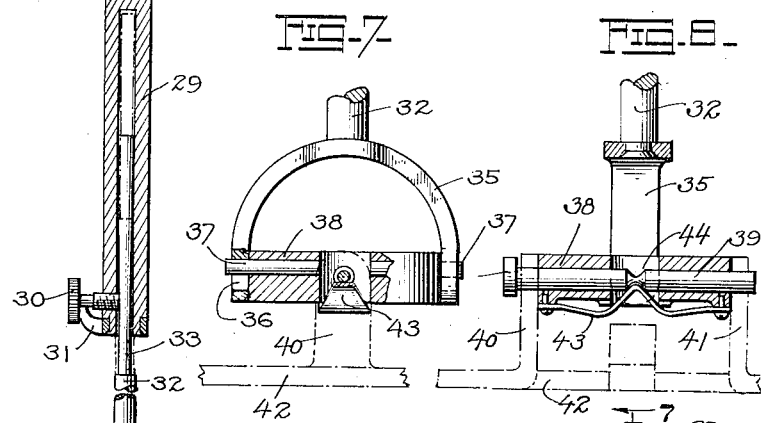
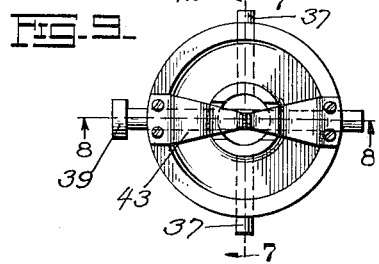
Inventor
Eoline R. Hand
By John B. Brady
Attorney Jan. 12, 1926.  1,569,745
E. R. HAND
RADIOCOMPASS READING DEVICE FOR SHIPS
Filed August 30, 1923    3 Sheets-Sheet 3

Inventor
Eoline R. Hand
By John B. Brady
Attorney

Patented Jan. 12, 1926.

1,569,745

UNITED STATES PATENT OFFICE.

EOLINE R. HAND, OF TOLEDO, OHIO.

RADIOCOMPASS READING DEVICE FOR SHIPS.

Application filed August 30, 1923. Serial No. 660,118.

*To all whom it may concern:*

Be it known that EOLINE R. HAND, a citizen of the United States, residing at Toledo, in the county of Lucas and State of Ohio, has invented certain new and useful Improvements in Radiocompass Reading Devices for Ships, of which the following is a specification.

My invention relates broadly to radio direction finding and more particularly to a ship's radio compass reading device for enabling accurate observations of radio directions to be made on shipboard.

One of the objects of my invention is to provide a radio compass reading device for shipboard installation which is simple and inexpensive in construction and which may be quickly assembled or disassembled by a navigator for taking observations of radio directions and used on the regular ship's standard compass without interfering with the ordinary use of the compass.

Another object of the invention is to provide a set of mechanical parts of a portable character which may be conveniently carried in a special kit to be used by the navigator in combination with the usual ship's magnetic compass by quickly assembling the parts together for the taking of bearings on distant radio beacons or other radio transmitting stations.

Another object of the invention is to provide means for indicating immediately the angle the loop makes with the fore-and-aft line of the ship directly on the compass card whereby after applying the correction for calibration error and also for variation and deviation, the true direction of the transmitting station becomes known.

Another object of my invention is to provide a mechanical assembly of parts between the axis of the loop antenna of the radio compass and a reading bar pivoted directly over the center of the magnetic compass and directly adjacent the card thereof whereby vibration of the ship, normal shocks and jars or sudden shocks and jars may be absorbed by the assembled parts without injury to the glass face of the compass.

Still another object of my invention is to provide a set of instruments for transferring the rotative movement of a coil antenna to a reading device pivotally mounted upon a magnetic compass with means forming part of the instruments for enabling universal movement of the parts whereby readings of the radio compass may be practically secured at all times regardless of the roll of the ship with inherent change in position of the parts of the radio compass with respect to the magnetic compass.

Another object of the invention is the provision of an indicator adjacent the operating shaft of the radio compass for warning the operator against movement of the operating shaft beyond given limits whereby the entanglement of the leads extending down from the coil antenna to the radio apparatus below is prevented.

Another object of my invention is to provide an arrangement of parts which enables radio direction readings to be taken directly upon the ship's standard compass without the provision of a special compass with the attendant expense of special fittings and castings.

A further object of the invention is the provision of a radio compass reading device mounted directly over and concentric with the magnetic compass card with parts of such weight balanced in such manner as to have no effect upon the movement of the compass bowl in the gimbal.

A still further object of the invention is to provide a radio compass reading device with parts arranged in such manner as to offer no interference when taking bearings with the azimuth circle.

Other and further objects will in part be obvious and will in part be pointed out in the specification hereinafter following and by reference to the accompanying drawings in which like reference characters have been used to represent like parts throughout the several views.

Figure 13:
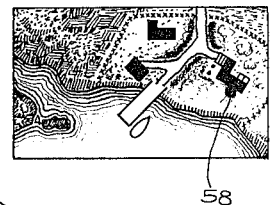
Figure 10:
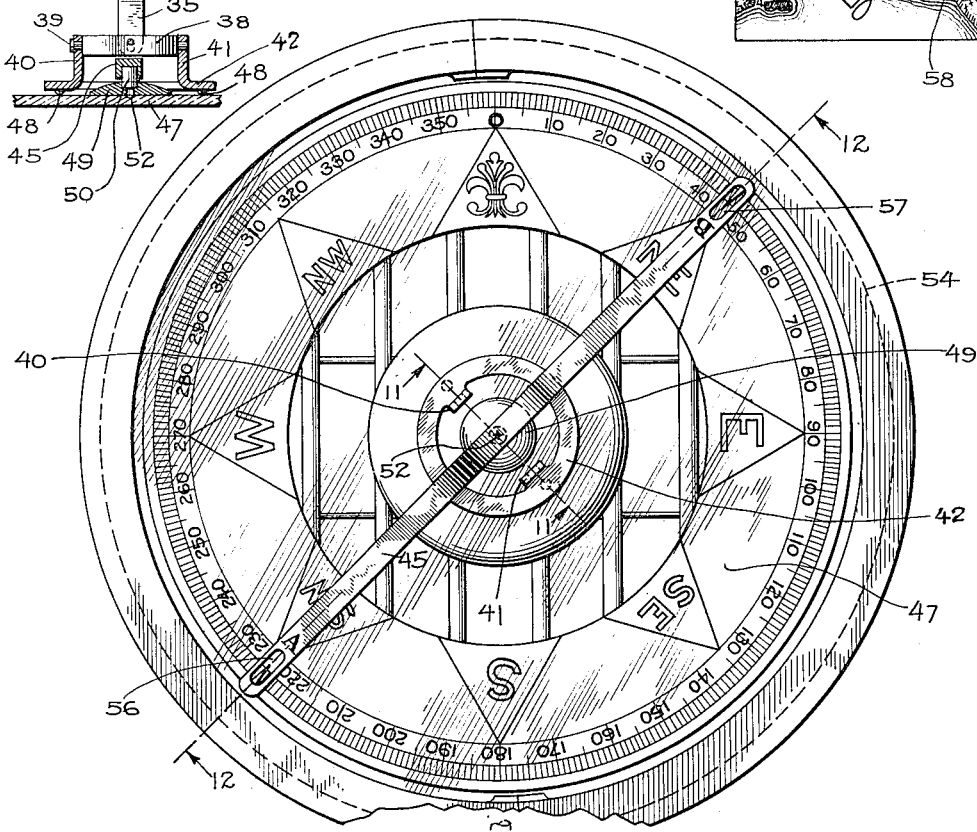
Figure 12:
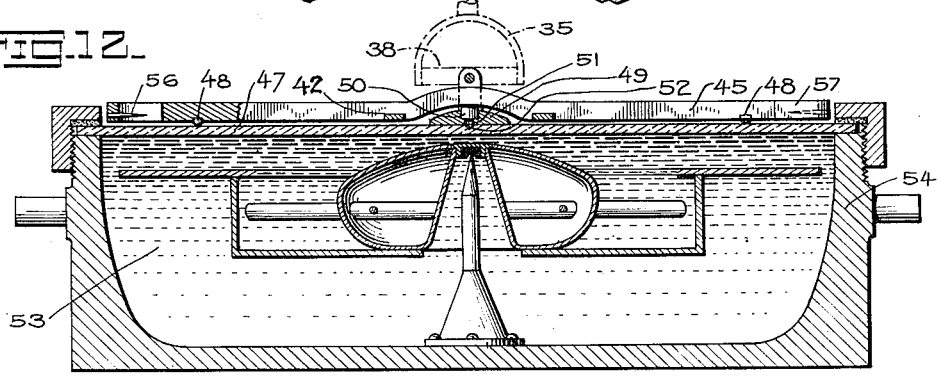

In the drawings Figure 1 is an assembly view showing my ship's radio compass reading device installed upon a magnetic compass in combination with a loop antenna; Fig. 2 shows an electrical characteristic curve of the coil antenna employed in securing maximum or minimum signals with my radio compass reading device; Fig. 3 is a fragmentary view showing the lower pivotal mounting of the coil antenna and the indicating device which I provide for warning the operator against revolving the coil antenna to such an extent that the leads from the coil antenna might be entangled; Fig. 4 is a side elevation of a portion of the assembled shafting of the ship's radio compass reading device; Fig. 5 is a side view of the yoke member interposed between the extremity of the lower end of the shaft of the coil antenna and the shafting of the radio compass reading device; Fig. 6 is an assembled view of the shafting of the radio compass reading device partially in perspective view and partially in cross section showing the arrangement I provide for enabling the reading device to be precisely centered over the magnetic compass card and the means I provide for preventing injury to the glass face of the magnetic compass and for absorbing ship's vibration and intermittent shocks and jars; Fig. 7 is a side elevation partially in cross section showing the joint member which is interposed in the shafting of the reading device directly over the magnetic compass; Fig. 8 is a cross sectional view of the joint member illustrated in Fig. 7 showing the means which 1 provide for quickly dismounting the reading bar from the vertical shafting; Fig. 9 is a lower plan view of the joint member illustrated in Figs. 7 and 8; Fig. 10 is a plan view illustrating the assembly of the reading device over the ship's compass: Fig. 11 is a view illustrating the method of mounting the reading bar on a pivot directly over the center of the magnetic compass; Fig. 12 is a partial view in cross section showing the relative arrangement of parts of the radio compass reading device and the magnetic compass; and Fig. 13 is a diagrammatic representation of a radio beacon located at port whose direction is to be determined from a ship at sea.

The radio compass as an aid to navigation has considerable value. There are numerous advantages in taking directional observations by radio for the proper laying out of a ship's course and my invention aims to fully utilize these advantages in a practical manner. Heretofore the installation of radio compasses on shipboard has been retarded due to the relatively large expense of installation on shipboard by reason of the requirement of a special magnetic compass installation separate and apart from the ship's standard compass. My invention contemplates the provision of a set of accurately machined instruments for securing radio compass readings. I make use of the standard ship's magnetic compass. A special compass with the inherent cost is not required. The loop antenna is mounted directly over the ship's standard compass with a short operating shaft projecting to a position over the standard compass. An accurately machined bearing is mounted in the exact mathematical center on the glass face of the ship's standard magnetic compass immediately over and concentric with the pivot of the compass card and in this bearing I pivot a reading bar which is free to revolve in the bearing throughout the area directly adjacent the compass card with negligible friction. The bearing bar as well as the associated parts is extremely light in weight and has no effect upon the movement of the magnetic compass in the gimbal. Observation center lines are provided at opposite extremities of the reading bar by which readings in degrees may be accurately made of the magnetic compass card below. On the end of the shaft projecting from the coil antenna I secure a yoke member by means of a screw free to swing with the pin as an axis but without play. The lower end of the yoke is removably fitted into a U shaped member on the extremity of a shafting. The shafting may comprise any desired number of sections coupled together and finally terminating in a type of universal joint for revolving the reading bar independently of the roll or vibration of the ship. The shafting immediately above the universal joint is split so that no interference is offered when taking readings with the azimuth circle on the compass glass.

Referring more particularly to the drawings reference character 1 represents the turns of wire comprising the loop antenna. The loop antenna may be of any desired construction. I have represented it as comprising a frame having cross frames 2 and 3 pivoted at the top at 4 and below in a bearing 5. A shaft 6 projects from the frame of the loop and may be revolved by means of a hand wheel 7 to rotate the coil antenna. The frame of the loop is suitably mounted for rotation on suitable supports, the lower support for which I have indicated at 8. The terminals for the turns of the loop 1 are represented at 9 and 10 and electrical conductors lead from these terminals and are connected with the radio receiving apparatus. The leads are left sufficiently slack to permit limited rotation of the coil antenna in normal operation. The slack leads which connect to the terminal posts 9 and 10 are suitably insulated from the coil support as represented for purposes of illustration at 11 and 12 and are brought down at 14 and 15 to the radio receiving apparatus. The receiving apparatus has been illustrated generally at 16 as being provided with tuning condenser 17 and suitable electron tube amplification to enable a signal response to be obtained in telephone receivers 18. The rotation of shaft 6 is limited by an indicator 19 which I provide adjacent the hand wheel of the operating shaft. The indicator illustrated is a coil spring disposed between the hand wheel and the support above which has the tendency to wrap itself around the shaft 6 in dotted line position 20 to warn the operator that further rotation of the shaft might entangle the leads from the terminals of the coil antenna. In this manner I do away with the necessity of providing slip rings and brushes. The yoke member 21 is secured by means of pin 22 threaded on the end extending through a cooperating bore in the lower extremity of shaft 6. The pin is secured against lateral movement but the yoke member 21 is free to swing in a vertical plane. The pin 22 is removably secured in the shaft 6 by hand screw 23 and nut 24. The lower end of yoke member 21 is provided with trunnions 25. The yoke member 21 may be tipped sidewise for inserting the trunnions 25 in slots 26 of the U shaped member 27 as represented more clearly in Fig. 6. The yoke member 21 is fixed in position but the U shaped member 27 is free to ride vertically with substantial vertical play but substantially no horizontal play. The U shaped member 27 is secured upon the extremity of a shaft 28. A socket member 29 is formed on the lower extremity of shaft 28. A set screw 30, provided with a safety device 31 for preventing loss of the screw during the continued use of the instruments, is provided at the lower portion of the socket 29. A lower shaft section 32 is provided with its upper extremity fitting into the socket member 29. The socket member 29 is substantially extended in length to accommodate the upper extremity of the shaft 32 in different positions to fit required dimensions in different installations. The upper extremity of the shaft 32 is slightly tapered as indicated at 33. The reason for this tapered joint is that in case sudden force in a longitudinal direction should come upon the shaft, the shaft will collapse lengthwise at the telescopic joint, the set screw failing to hold the tapered portion of the lower shaft section when the shafts tend to slide toward each other although the set screw firmly holds the shafts when normal conditions exist.

The lower extremity of the shaft 32 is split as indicated at 34 to enable the radio compass reading device to be used when observations are being made with the azimuth circle. The observer may look directly through the split portion 34 of the rod 32 in taking these readings. In doing this the observer merely unclamps the thumb screw 30 and twists the rod 32 to such a position that he is enabled to look directly through the split portion 34. It is therefore unnecessary to disassemble the reading device when taking readings with the azimuth circle other than to merely twist the shaft 32 in such position that the observer may look through bowed portion 34. At the end of the shaft 32 I provide a U shaped member 35 having its sides extending downward. Elongated slots 36 are provided in each of the U shaped side members in which pins 37 protruding from joint member 38 are pivoted. The joint member has the form of a circular disk 38 which is provided with a central bore through which a removable pin 39 may be slipped to assemble the joint member 38 on pivots provided in the upstanding sides 40 and 41 of circular ring 42. Pin 39 is latched in position in the side members 40 and 41 by means of a leaf spring 43 having an upwardly projecting notched portion which cooperates with an annular detent 44 in the removable pin 39. The cam faces on each side of the annular detent enables the pin 39 to be withdrawn from the side members 40 and 41 pushing down the spring member 43 for disassembling the instruments or enabling the spring member 43 to quickly ride into the annular detent for latching the pin when assembling the instruments. The ring member 42 carries a reading bar 45 which extends substantially the length of the diameter of the compass card 46. The ring 42 and the reading bar 45 are normally spaced from the glass face 47 of the standard magnetic compass by means of ivory bosses 48 for maintaining the metal at all times away from the glass. The reading bar is raised from the compass glass 47 by a step bearing 49. This step bearing is formed by a disk having a central bore counterbored from the top as indicated at 50 in which a pivot pin 51 in the reading bar 45 is centered. The step bearing 49 is cemented by any suitable means such as shellac to the mathematical center of the glass 47 by locating the center by means of a small indent 52. This center is precisely over the center of the magnetic compass card 46 which floats in the liquid 53 contained in bowl 54 on central pivot 55. The standard compass card 46 is graduated in degrees as represented in Fig. 10. The reading bar 45 contains an observation sight 56 and 57 with center lines secured thereon to enable accurate degree readings through the reading bar upon the scale of the magnetic compass which lies directly beneath.

In the operation of my radio compass reading device the various mechanical parts may be quickly assembled or disassembled for the taking of observations as has been hereinbefore described. The yoke member 21 is first pivotally connected to the lower extremity of the shaft 6. The shaft 28 is then connected with the yoke member by slipping it over the trunnions 25 on the yoke member which slide in the slots 26. The shaft 28 is now hanging downwardly in a vertical position. This section of the shaft is now drawn to one side which movement is afforded by reason of the universal joint formed by the yoke member and the U shaped member 27. Shaft 32 is slipped into the socket member 29 the reading bar having been connected at its lower extremity by means of the pin 39 hereinbefore described.

The step bearing 49 as previously described is positioned over the center of the magnetic compass and the reading bar is pivotally mounted thereon. The shaft 32 together with the lower universal joint and the reading bar is now free to rotate in the socket of the shaft section 28. The loop antenna is brought to a position in which the turns are as near parallel as possible with the fore-and-aft line of the ship. With the coil in this position the bearing bar is also brought around to a line parallel with the fore-and-aft line of the ship by means of setting one of the observation sights on the lubber-line of the compass bowl. The shaft sections are then clamped together against independent rotation by tightening thumb screw 30. It is absolutely necessary that the same relative position of the reading bar and the turns of the coil antenna be set up in assembling the instruments for observation. This may be accomplished by bringing the coil to a given position which will always be a fixed position in the assembling process.

In taking observations on radio transmitting stations the maximum and minimum method is employed utilizing the characteristic curve of the loop antenna as represented in Fig. 2. Referring to Fig. 13 a radio transmitting station located at 58 on shore may be employed as the station on which the radio bearing is to be taken. In securing the radio direction upon a distant radio transmitter I read the minimum signal on either side of the maximum and then obtain the mean of the different readings whereby the direction of the radio transmitting station may be determined by correcting the mean reading for the error found by calibration.

While I have described my invention in certain specific embodiments it is to be understood that modifications in detail may be made and that I intend no limitations upon the invention other than are imposed by the scope of the appended claims.

What I claim and desire to secure by Letters Patent of the United States is as follows:

1. A radio compass reading device for shipboard, comprising in combination a loop antenna, means for rotating said loop antenna, a magnetic compass, a reading bar pivoted on said magnetic compass, said reading bar and magnetic compass being so arranged that said bearing bar is substantially parallel to said magnetic compass and remains substantially horizontal with respect to the earth independent of the position of the ship, a connection between said bearing bar and said shaft and means for determining the direction of a radio transmitting station and the angle which said loop antenna makes with the fore-and-aft line of the ship.

2. A radio compass reading device for shipboard, comprising in combination a loop antenna, a shaft for rotating said antenna, a magnetic compass, a compass card, an indicator connected to the lower end of said shaft and arranged to lie substantially parallel to said compass card independent of the position of the ship to cooperate with said compass for taking observations and means interposed in said shaft between said loop antenna and said indicator for substantially reducing the transfer of shocks and jars through said shaft.

3. A radio compass reading device for shipboard, comprising in combination a loop antenna, a shaft for rotating said antenna, a magnetic compass, a compass card, an indicator connected to the lower end of said shaft and arranged to lie substantially parallel to said compass card independent of the position of the ship to cooperate with said compass card for taking observations, and a plurality of means interposed in said shaft between said loop antenna and said indicator for substantially reducing the transfer of shocks and jars through said shaft.

4. A radio compass reading device for shipboard, comprising in combination a loop antenna, a shaft for rotating said antenna, a magnetic compass, a compass card, an indicator connected to the lower end of said shaft and arranged to lie substantially parallel to said compass card independent of the position of the ship to cooperate with said compass card for taking observations, and a plurality of separate means interposed in said shaft between said loop antenna and said indicator, one of said means operating to absorb normal ship vibration in a vertical direction, another of said means substantially eliminating the transfer of shocks and jars of greater amplitude and still another of said means operating to prevent sudden vertical pressure on said shaft from imparting injurious force to said magnetic compass.

5. A radio compass reading device for shipboard, comprising in combination a loop antenna, a shaft for rotating said antenna, a magnetic compass, a reading bar pivotally mounted directly upon said magnetic compass said reading bar and magnetic compass being so arranged that said reading bar is substantially parallel to said magnetic compass and remains substantially horizontal with respect to the earth independent of the position of the ship, said reading bar being a connection between said shaft and said reading bar and means interposed between said loop antenna and said reading bar whereby said reading bar remains permanently in the same horizontal position with respect to said magnetic compass independently of vertical or lateral movement of said shaft for accurately observing radio directions.

6. A radio compass reading device for shipboard, comprising in combination a loop antenna, a shaft for rotating said antenna, a magnetic compass, a reading bar pivotally mounted directly upon said magnetic compass as a center and rotatable according to the rotation of said shaft in a substantially horizontal plane with respect to the earth and a plurality of universal joints interposed in said shaft between said loop antenna and said reading bar whereby said reading bar remains permanently in the same horizontal position with respect to said magnetic compass independently of vertical or lateral movement of said shaft for accurately observing radio directions on said magnetic compass.

7. A radio compass reading device for shipboard, comprising in combination a loop antenna, a shaft for rotating said antenna, a magnetic compass, a reading bar pivotally mounted directly upon said magnetic compass as a center and rotatable according to the rotation of said shaft, in a plane substantially parallel with respect to the earth, a plurality of universal joints interposed in said shaft between said loop antenna and said reading bar and means in said shaft for absorbing mechanical vibratory shocks and jars whereby said reading bar remains permanently in the same horizontal position with respect to said magnetic compass independently of vertical or lateral movement of said shaft for accurately observing radio directions on said magnetic compass.

8. A radio compass reading device for shipboard, comprising in combination a loop antenna, a shaft for rotating said antenna, a magnetic compass, a reading bar pivotally mounted directly upon said magnetic compass and rotatable according to the rotation of said shaft in a plane substantially horizontal with respect to the earth, a plurality of universal joints interposed in said shaft between said loop antenna and said reading bar, means forming part of said joints for absorbing mechanical vibrations and sudden shocks and jars and separate means interposed between said aforementioned means for substantially reducing the transfer of severe shocks and jars through said shaft whereby said reading bar remains permanently in the same horizontal position with respect to said magnetic compass independently of vertical or lateral movement of said shaft for accurately observing radio directions on said magnetic compass.

9. A radio compass reading device for shipboard, comprising in combination a loop antenna, a shaft for rotating said antenna, a magnetic compass, a reading bar pivotally mounted directly upon said magnetic compass and rotatable according to the rotation of said shaft in a plane substantially horizontal with respect to the earth, a plurality of universal joints interposed in said shaft between said loop antenna and said reading bar, means forming part of said joints for absorbing mechanical vibrations and sudden shocks and jars and separate means for substantially reducing the transfer of severe shocks and jars through said shaft whereby said reading bar remains permanently in the same horizontal position with respect to said magnetic compass independently of vertical or lateral movement of said shaft for accurately observing radio directions on said magnetic compass.

10. A radio compass reading device for shipboard, comprising in combination a loop antenna, a magnetic compass, a shaft for rotating said antenna, a yoke member pivotally secured in the lower extremity of said shaft, a pair of trunnions in the lower extremity of said yoke member, a shaft, a U shaped slotted member on the upper extremity of said shaft arranged to receive said pair of trunnions and a socket member on the opposite end of said shaft, a separate shaft member arranged to slidably and removably set into said socket member, a split portion adjacent the lower end of said shaft member, a universal joint at the extremity of said shaft member, a reading bar pivotally mounted on said magnetic compass and connected with said universal joint whereby rotative movement imparted to said shaft in rotating said antenna causes rotation of said reading bar over said magnetic compass.

11. A radio compass reading device for shipboard, comprising in combination a loop antenna, a shaft for rotating said antenna, a magnetic compass, a reading bar pivotally mounted directly upon said magnetic compass, a yoke member pivotally secured to the lower extremity of said shaft, connecting means between said yoke member and said reading bar, a universal joint adjacent each end of said connecting means and separate means interposed within the length of said connecting means for collapsing said connecting means under conditions of sudden vertical force.

12. A radio compass reading device for shipboard, comprising in combination a loop antenna, a shaft for rotating said antenna, a magnetic compass, a reading bar pivotally mounted directly upon said magnetic compass, a pivotal member secured to the lower extremity of said shaft, connecting means between said member and said reading bar, a universal quickly removable joint adjacent each end of said connecting means and separate means interposed within the length of said connecting means between said removable joints for collapsing said connecting means under conditions of sudden vertical force.

13. A radio compass reading device for shipboard, comprising in combination a loop antenna, a shaft for rotating said antenna, a magnetic compass, a reading bar pivotally mounted directly upon said magnetic compass, a pivotal member secured to the lower extremity of said shaft, a shaft member connected to said pivotal member, a separate shaft member connected to said reading bar and means connecting said shaft members whereby said first mentioned shaft member may be rotated to position said loop antenna in a particular plane and said second mentioned shaft member independently rotated to position said reading bar in a particular plane and said connecting means set whereby said loop antenna and said reading bar move simultaneously for reading radio directions on said magnetic compass.

14. A radio compass reading device comprising in combination a loop antenna, a step bearing adapted to be mounted immediately over the center of said magnetic compass, a magnetic compass, a reading bar pivotally mounted on said magnetic compass in said step bearing and a pair of concentric independently rotatable shaft sections connecting said loop antenna and said reading bar.

15. A radio compass reading device comprising in combination a loop antenna, a magnetic compass, a disk member adapted to be mounted directly over the center of said magnetic compass, an indicator pivotally mounted upon said disk member for rotation relative to said magnetic compass, a pair of concentric independently rotatable shaft sections interposed between said loop antenna and said indicator and a quickly demountable universal joint at opposite ends of said shaft sections.

In testimony whereof I affix my signature.

EOLINE R. HAND.